| United States Patent [19] | [11] 3,957,530 |
|---|---|
| Reusser | [45] May 18, 1976 |

[54] TERNARY AZEOTROPIC PAINT STRIPPING COMPOSITIONS

[75] Inventor: Robert E. Reusser, Bartlesville, Okla.

[73] Assignee: Phillips Petroleum Company, Bartlesville, Okla.

[22] Filed: Mar. 31, 1975

[21] Appl. No.: 563,400

Related U.S. Application Data

[62] Division of Ser. No. 338,417, March 6, 1973, Pat. No. 3,904,542.

[52] U.S. Cl. .................................. 134/4; 134/38; 252/165; 252/DIG. 8; 252/DIG. 9
[51] Int. Cl.² .................. B08B 3/08; C23D 17/00; C23G 5/02
[58] Field of Search ............... 134/4, 38; 252/165, 252/DIG. 8, DIG. 9, 171

[56] References Cited
UNITED STATES PATENTS

| 3,554,918 | 1/1971 | Schofield et al. .................... 252/171 |
| 3,671,445 | 6/1972 | Schofield et al. .................... 252/171 |
| 3,728,268 | 4/1973 | Burt ............................... 252/DIG. 9 |

OTHER PUBLICATIONS

*Chemical Week*, Vol. 109, Oct. 20, 1971, "Paint Remover Sales Take Off", pp. 65–66.

*Chemical Abstracts*, Vol. 55 (23,877h), 1961.

*Chemical Abstracts*, Vol. 66 (3848q), 1967.

*Chem. and Engr. News*, Vol. 37, No. 25, 1959, pp. 66–71 and 103.

*Primary Examiner*—S. Leon Bashore
*Assistant Examiner*—Marc L. Caroff

[57] ABSTRACT

Constant boiling admixtures are formed with 1,2-dichloro-1-fluoroethane, acetone, and methanol and applied to painted surfaces to remove paint therefrom.

12 Claims, No Drawings

TERNARY AZEOTROPIC PAINT STRIPPING COMPOSITIONS

This is a divisional application of Ser. No. 338,417 now U.S. Pat. No. 3,904,542.

FIELD OF THE INVENTION

The invention relates to novel compositions of chlorofluorocarbon. In another aspect, the invention relates to paint removers.

BACKGROUND OF THE INVENTION

Constant boiling admixtures are liquid mixtures of two or more substances, which mixtures behave like a single substance in that the vapor produced by partial evaporation or distillation has the same composition as does the liquid. Constant boiling compositions characterized as azeotropes exhibit either a maximum or minimum boiling point as compared with that of other but nonazetropic mixtures of the same two or more substances.

OBJECTS OF THE INVENTION

It is an object of the invention to provide novel substantially constant-boiling compositions. It is a further object of the invention to provide novel paint removers.

Other aspects, objects, and the several advantages of my invention will be readily apparent to one skilled in the art to which the invention most nearly pertains from the reading of my description and the consideration of my appended claims.

BRIEF SUMMARY OF THE INVENTION

I have discovered that 1,2-dichloro-1-fluoroethane forms with acetone and methaol together substantially admixtures of surprisingly broad range of relative composition yet with unusual constancy of boiling point, and, indeed, form at least one ternary azeotrope.

A constant boiling admixture which distils without change in composition is defined as an azeotrope. Yet, at a differing pressure, the composition indeed may vary, at least slightly, with the change in distillation pressure, which also changes, at least slightly, with the change in distillation temperature. Thus, an azeotrope of A and B may represent a unique type of relationship with a variable composition.

Thus, it should be possible to fingerprint, in effect, a constant-boiling admixture which may appear under varying guises, depending on the conditions chosen, by any of several criteria: the composition may be defined as an azeotrope of A and B, since the very term "azeotrope" is at once definitive and limitative, requiring that A and B indeed form this unique composition of matter which is a constant-boiling admixture. Or, the composition may be defined as a particular weight percent relationship or mole percent relationship of A:B, but recognizing that such values point out only one particular such relationship, while in actuality a series of such relationship A:B actually may exist for an azeotrope, varied by influence of temperature and pressure. Or, recognizing that broadly speaking, an azeotrope of A:B actually represents just such a series of relationships, the azeotropic series represented by A:B may in effect be fingerprinted or characterized by defining the composition as an azeotrope further characterized by a particular boiling point at a given pressure, thus giving identifying characteristics without unduly limiting the scope of the invention.

The ternary admixtures I have discovered contain 1,2-dichloro-1-fluoroethane and acetone and methanol characterized by a boiling point of about 59° to 61° C. at a pressure of about 761 mm Hg. These components together form these unique boiling admixtures which broadly are characterized as containing about 25 to 41 weight percent 1,2-dichloro-1-fluoroethane, about 25 to 33 weight percent acetone, and about 26 to 40 weight percent methanol. These are not unusual wide ranges for such a tight boiling pont and reflect the uniqueness of the compositions of my discovery.

The ternary composition as an azeotrope appears to be closer to about 40–41 weight percent 1,2-dichloro-1-fluoroethane, about 32–33 weight percent acetone and about 26–28 weight percent methanol at a temperature:pressure relationship of about 59° to 61° C. at 761 mm Hg, though it would be improper to so strictly define the ternary azeotrope for reasons as discussed above, and due to possible slight variations in accuracy of monitoring analytical equipment.

EXAMPLE

The following data are presented to illustrate my invention and to show the determination of the admixtures I have dicovered.

Example I

An admixture of 1,2-dichloro-1-fluoroethane, methanol, and acetone was charged to a reflux-equipped distilling column. The charge contained approximately 48.1 weight percent 1,2-dichloro-1-fluoroethane, 21.4 weight percent acetone, and 30.5 weight percent methanol. Cuts of the distillate were analyzed by chromatographic method so as to determine the approximate composition of the overhead cuts. It is recognized that a specific temperature:pressure relationship governs a particular composition at a given time.

Distillation of the admixture was in an 18 × ¾ inch stainless steel packed column at about 761 mm Hg pressure at a reflux ratio of 5 to 1 which produced cuts of the following composition:

TABLE I

| Overhead Distillation Temp., °C. | Fraction | Cumulative Overhead, % | Overhead Weight Percent Composition | | |
|---|---|---|---|---|---|
| | | | 141[(a)] | Acetone | Methanol |
| 58 | 1 | 1.4 | 31.4 | 24.0 | 35.6 |
| 59 | 2 | 9.6 | 24.8 | 31.0 | 44.3 |
| 59 | 3 | 32.9 | 39.6 | 32.0 | 28.4 |
| 60 | 4 | 48.5 | 40.9 | 32.8 | 26.2 |
| 61 | 5 | 71.4 | 39.2 | 25.6 | 28.5 |
| 73 | 6 | 83.6 | 62.3 | 0 | 37.7 |
| 73 | 7 | 94.7 | 85.9 | 0 | 14.3 |

[(a)]1,2-dichloro-1-fluoroethane.

Differences between the total of combining the three components and 100 weight percent reflects minor traces of other materials possibly present in the charged admixture, or undetermined on analysis. As can be observed, the admixtures boil at 59° to 61° C. at 761 millimeters mercury and range from about 25 to 41 weight percent 1,2-dichloro-1-fluoroethane, 25 to 33 weight percent acetone, and 26 to 40 weight percent methanol. Thus, compositions in such a range are considered to be included in my discovery, atlthough the azeotrope itself, considering the accuracy and possible shortcomings of analytical equipment itself, appears to be more nearly 40–41:32–33:26–28 1,2-dichloro-1-fluoroethane:acetone:methanol at the apecified temperatures and pressure relationship.

The ternary admixtures prepared as above were employed as a paint remover.

A portion of admixtures of the invention, specifically combined fractions 3 and 4, was gelled with approximately 0.4 weight percent Union Carbide Corporation Polyox, characterized as a polyethylene oxide.

The gelled sample as well as an ungelled sample of combined fractions 3 and 4 were applied to painted carbon steel metal surfaces which had been painted with a standard enamel type paint in an oil base applied as a spray paint. The painted surface had been painted approximately 6 months prior to the run in order to provide adequate curing and solidification time.

About 5 drops of each sample were placed on the end of the painted plate with the plate laying in a flat position. In less than 30 seconds the so-treated painted surfaces were freely wiped clean of paint.

The formulations further were tested on vertically positioned painted surfaces. The gelled formulation was found to remove the paint well, while the ungelled formulation ran off too quickly for appreciable effectiveness.

In applying my formulations as gelled paint removers, any type of suitable gellant may be employed. Among these types are methyl or ethyl cellulose, cellulose acetate, nitrocellulose, paraffin waxes, as well as including the polyalkylene oxides available commonly called Polyox. A range of 0.1 to 5 weight percent preferably can be employed, though more or less may be employed depending on the gellant and degree of gellation desired. Such gelling agents can be incorporated into the ternary compositions by any of the usual means such as mixing with stirring at suitable temperatures for the gelling agent.

The constant boiling ternary admixtures which I have discovered are useful as commercial solvents for a variety of purposes, such as degreasing solvents, and certainly will find particular activity as flux removers from electrical circuit boards, as well as for the demonstrated use as paint removers. The azeotropic admixture is particularly useful for such applications as specialty refrigeration, vapor phase degreasing, and circuit-board flux solvents. The constant boiling ternary admixtures of my discovery also can be used as aerosol propellants, as blowing agents in the manufacture of foam-mold plastics, as cleaning solvents for various purposes, such as garments and the like.

From the preceding descriptions, it will be apparent that my invention provides novel substantial constant boiling and azeotropic compositions useful for a wide variety of purposes.

Certainly, reasonable variations and modifications of my invention are possible yet still within the scope of my disclosure and without departing from the intended scope and spirit thereof.

I claim:

1. A process for removing paint from painted surfaces which comprises contacting said painted surface with a substantially constant boiling admixture comprising (A) 1,2-dichloro-1-fluoroethane, (B) acetone, and (C) methanol, characterized by a weight percent ratio of about 25 to 41 (A), about 25 to 33 (B), and about 26 to 40 (C), thereby softening said paint, and thereafter removing said paint.

2. The process according to claim 1 wherein said admixture is characterized by a boiling point of about 59° to 61°C at about 761 millimeters mercury.

3. The process according to claim 2 wherein said substantially boiling admixture is characterized by a weight percent ratio of about 40 to 41 (A), about 32 to 33 (B), and about 26 to 28 (C), wherein said admixture represents a ternary azeotrope.

4. The process according to claim 1 wherein said softening admixture further comprises a gellant, such that said admixture is a gelled composition.

5. The process according to claim 4 wherein said gellant is a methyl or ethyl cellulose, cellulose acetate, nitrocellulose, paraffin wax, or polyalkylene oxide, and is employed in a range of about 0.1–5 weight percent gellant relative to said admixture of (A), (B) and (C).

6. The process according to claim 5 wherein said gellant is said polyalkylene oxide, and is a polyethylene oxide.

7. A substantially gelled paint softening composition suitable for softening paint on painted surfaces which comprises (I) a substantially constant boiling admixture of (A) 1,2-dichloro-1-fluoroethane, (B) acetone, and (C) methanol, characterized by a weight percent ratio of about 25 to 41 weight percent (A), about 25 to 33 weight percent (B), and about 26 to 40 weight percent (C), and (II) a gellant employed in an amount effective to result in a substantially gelled composition.

8. The composition according to claim 7 wherein said admixture is characterized by a weight percent ratio of about 40 to 41 (A), about 32 to 33 (B), and about 26 to 28 (C).

9. The composition according to claim 7 wherein said gellant is a methyl or ethyl cellulose, cellulose acetate, nitrocellulose, paraffin wax, or polyalkylene oxide, and is employed in a range of about 0.1–5 weight percent gellant relative to said admixture of (A), (B) and (C).

10. The composition according to claim 8 wherein said gellant is said polyalkylene oxide, and is a polyethylene oxide.

11. A method of preparing a paint softening composition as described in claim 7 which comprises admixing 1,2-dichloro-1-fluoroethane, acetone, methanol, and at least one gellant, employing a weight percent ratio of about 25 to 41 weight percent 1,2-dichloro-1-fluoroethane, about 25 to 33 weight percent acetone, about 26 to 40 weight percent methanol, and about 0.1–5 weight percent said gellant.

12. The method according to claim 11 wherein said gellant is a methyl or ethyl cellulose, cellulose acetate, nitrocellulose, paraffin wax,or polyalkylene oxide. wax, or

* * * * *